(12) United States Patent
McGleenan et al.

(10) Patent No.: US 12,478,973 B2
(45) Date of Patent: Nov. 25, 2025

(54) PIPETTE TIP CARRIER ASSEMBLY

(71) Applicant: RANDOX LABORATORIES LTD, Crumlin (GB)

(72) Inventors: Proinnsias McGleenan, Crumlin (GB); P Evans, Crumlin (GB); Stuart Jackson, Crumlin (GB); Martin Reid, Crumlin (GB); Peter Fitzgerald, Crumlin (GB)

(73) Assignee: RANDOX LABORATORIES LTD, Crumlin (GB)

( * ) Notice: Subject to any disclaimer, the term of this patent is extended or adjusted under 35 U.S.C. 154(b) by 1014 days.

(21) Appl. No.: 17/602,897

(22) PCT Filed: Apr. 8, 2020

(86) PCT No.: PCT/GB2020/050916
§ 371 (c)(1),
(2) Date: Oct. 11, 2021

(87) PCT Pub. No.: WO2020/208352
PCT Pub. Date: Oct. 15, 2020

(65) Prior Publication Data
US 2022/0193685 A1      Jun. 23, 2022

(30) Foreign Application Priority Data
Apr. 12, 2019   (GB) ..................... 1905230

(51) Int. Cl.
*B01L 9/00*       (2006.01)
(52) U.S. Cl.
CPC ......... *B01L 9/543* (2013.01); *B01L 2200/025* (2013.01); *B01L 2200/04* (2013.01); *B01L 2300/0809* (2013.01)

(58) Field of Classification Search
CPC .......... B01L 2200/025; B01L 2200/04; B01L 2300/0809; B01L 2300/168; B01L 9/543; G01N 2035/103
See application file for complete search history.

(56) References Cited

U.S. PATENT DOCUMENTS 5,642,816 A * 7/1997 Kelly .................. B01L 9/543
211/74
2010/0281961 A1* 11/2010 Saiki .................. G01N 21/07
73/64.56

(Continued)

FOREIGN PATENT DOCUMENTS

| WO | 2013/049706 A1 | 4/2013 |
| WO | 2017/001676 A1 | 1/2017 |
| WO | WO-2020120567 A1 * | 6/2020 ......... G01N 35/0099 |

OTHER PUBLICATIONS

Sep. 10, 2020—(WO) International Search Report & Written Opinion—App. No. PCT/GB2020/050916.

*Primary Examiner* — Jennifer Wecker
*Assistant Examiner* — Jonathan Bortoli
(74) *Attorney, Agent, or Firm* — Banner & Witcoff, Ltd.

(57) ABSTRACT

A pipette tip carrier assembly suitable for storing elongate pipette tips in a biochemical analyser is described. The pipette tip carrier assembly comprises one or more holding elements each adapted to hold, in use, a respective pipette tip oriented such that the elongate dimension of the held pipette tip is parallel to a first axis. The pipette tip carrier assembly also includes a light source arranged to produce, at a position distal to the one or more holding elements along the first axis, light directed towards each of the one or more holding elements so as to be intercepted by one or more pipette tips held in 10 use by the one or more holding elements.

6 Claims, 9 Drawing Sheets

(56) References Cited

U.S. PATENT DOCUMENTS

| | | | |
|---|---|---|---|
| 2011/0100998 A1* | 5/2011 | Komaki | B41J 2/17513 |
| | | | 220/500 |
| 2011/0306051 A1* | 12/2011 | Belz | A01G 7/00 |
| | | | 435/6.12 |
| 2013/0065797 A1 | 3/2013 | Silbert et al. | |
| 2013/0288873 A1 | 10/2013 | Barbee et al. | |
| 2015/0174579 A1* | 6/2015 | Iten | B65D 25/108 |
| | | | 422/560 |
| 2016/0129443 A1* | 5/2016 | Tovar | G01N 15/1484 |
| | | | 506/40 |
| 2016/0158814 A1 | 6/2016 | Safavi | |
| 2017/0269115 A1 | 9/2017 | Schmidt et al. | |
| 2018/0193500 A1 | 7/2018 | Safavi et al. | |
| 2022/0065885 A1* | 3/2022 | Kroog | G01N 35/10 |

\* cited by examiner

PIPETTE TIP CARRIER ASSEMBLY

CROSS-REFERENCE TO RELATED APPLICATIONS

This application is a U.S. National Stage application under 35 U.S.C. § 371 of International Application PCT/GB2020/050916 (published as WO 2020/208352 A1), filed Apr. 8, 2020, which claims the benefit of priority to United Kingdom Patent Application No. 1905230.7, filed Apr. 12, 2019. Benefit of the filing date of each of these prior applications is hereby claimed. Each of these prior applications is hereby incorporated by reference in its entirety.

FIELD OF THE INVENTION

The invention relates to a pipette tip carrier assembly, and in particular a pipette tip carrier suitable for storing pipette tips in a biochemical analyser.

BACKGROUND

Automated biochemical assays involve dispensing a large number of liquid samples onto a reactive substrate such as a biochip. After receiving the samples, the substrate is analysed and on the basis of this analysis, properties of the samples can be determined. The analysis could involve the detection of light produced by chemiluminescence as the samples react with chemically active sites on the surface of a biochip, for example.

In a typical biochemical analyser, a robot retrieves clean pipette tips from a cartridge in a storage area and transports them to the location of the substrate. Liquid samples are then dispensed onto the substrate at the appropriate positions via the pipette tips. The used pipette tips are then transported away from the substrate and disposed of or recovered and cleaned for further use.

US-A-2017/0269115 describes a method for determining the presence or absence of disposable pipette tips in pipette tip carriers on the work area of a laboratory workstation. A digital camera is arranged above a pipette tip carrier, and presence of pipette tips is inferred based on the difference in brightness between the materials of the pipette tips and the pipette tip carrier. The pipette tips described in this document are made of a material that is significantly darker than the pipette tip carrier, so a given part of the pipette tip carrier will appear darker when a pipette tip is held in that part of the carrier than when no pipette tip is present. The presence of pipette tip carriers is inferred on this basis.

Biochemical assays often consume a large number of pipette tips, and require the robot responsible for collecting the clean pipette tips to make many trips between the storage area and the substrate. The robot is typically provided with a number of receptacles, each of which is capable of collecting and holding a respective pipette tip. The receptacles are arranged at fixed positions with respect to one another: for example, the cartridge might store pipette tips upright and adjacent to one another in a grid-like arrangement, and receptacles could be spaced along a straight line at a separation corresponding to the distance between alternate points on the grid. If there is no group of pipette tips arranged in the cartridge at positions corresponding to the arrangement of the receptacles, the robot will not be able to collect the maximum possible number of pipette tips in one step and will instead need to move to different positions over the cartridge in order to allow each receptacle to collect a pipette tip. The robot could alternatively travel to the location of the substrate without taking the necessary steps to provide each receptacle with a clean pipette tip but proceeding in this way would increase the total number of trips that the robot must complete in order to carry out the assay, further prolonging the completion of the assay.

Delays can also occur if an assay commences when fewer pipette tips than the number required to complete the assay are available in the cartridge. Under such circumstances, the assay must be suspended while the cartridge is removed, refilled with clean pipette tips and returned to analyser.

There is therefore a need to improve the speed with which clean pipette tips can be supplied to the analyser for use in dispensing samples during an assay.

SUMMARY OF THE INVENTION

In accordance with a first aspect of the invention there is described a pipette tip carrier assembly suitable for storing elongate pipette tips in a biochemical analyser, the pipette tip carrier assembly comprising: one or more holding elements each adapted to hold, in use, a respective pipette tip oriented such that the elongate dimension of the held pipette tip is parallel to a first axis; and a light source arranged to produce, at a position distal to the one or more holding elements along the first axis, light directed towards each of the one or more holding elements so as to be intercepted by one or more pipette tips held in use by the one or more holding elements.

A pipette tip carrier assembly in accordance with the first aspect of the invention enables the number and individual locations of pipette tips in the pipette tip carrier assembly to be determined. Light is directed towards each holding element along the first axis. This does not mean that light from the light source may only be directed along the first axis, or that the trajectory of the light is necessarily parallel to the first axis; all that is required is that some of the light produced by the light source is directed towards the holding elements along a trajectory that has a component along the first axis (i.e. such that the trajectory is not perpendicular to the first axis). When a pipette tip is held by a respective holding element, it intercepts light from the light source. The pipette tip will attenuate and/or scatter at least some, if not all, of the light incident on it. It is possible to determine which holding elements are holding respective pipette tips at a given time by observing whether light from the light source has been intercepted at the positions of the holding elements. If a substantial flux of light from the light source is being received from the position of a particular holding element, it can be inferred that the holding element is vacant, whereas if a comparatively low flux of light (or no light at all) is being received from that position, it can be inferred that the holding element is occupied by a pipette tip.

Detecting the presence of pipette tips in the pipette tip carrier assembly allows the speed with which an assay is carried out to be increased. Firstly, it can be determined, by counting the number of holding elements that are currently holding a pipette tip (as determined by the absence of light from the light source at the respective holding elements), whether enough pipette tips are currently available to perform a particular assay. If the number available is sufficient, the assay may commence; otherwise, additional pipette tips can be supplied in advance so that it will not be necessary to re-fill the pipette tip carrier assembly part-way through the assay (which would require the assay to be suspended). Secondly, in a typical biochemical analyser, clean pipette tips are collected in groups by a robot that is configured to hold pipette tips in a predetermined arrangement (as explained above in the background section). In order for the robot to pick up the maximum number of pipette tips in one step, there must be a group of pipette tips arranged at corresponding positions in the pipette tip carrier assembly. If this is not the case, the robot must either adjust its position in order to retrieve pipette tips from different parts of the pipette tip carrier, or alternatively fail to collect the maximum number of pipette tips that it is capable of holding—in either case, the progress of the assay is impeded since the robot will not collect the greatest possible number of pipette tips in the shortest possible time.

The light source enables the reliable detection of pipette tips. A detector such as a camera can be arranged to detect light from the light source and determine whether a pipette tip is present at the position of each holding element based on the light received from each such position. The inventors have realised that the provision of a light source assists in the detection of pipette tips by a camera since the appearance of light at the position of each vacant holding element greatly increases the contrast between the occupied holding elements and those that are vacant. While it is possible to attempt to detect pipette tips without a light source (for example by attempting to measure the contrast between adjacent parts of a pipette tip carrier in order to gauge a difference in colour between the materials of the pipette tips and the apparatus itself), the use of a light source has been found to result in significant improvements in reliability and accuracy of detection over such comparative examples.

For example, the method described in US-A-2017/0269115 relies on comparing the observed brightness of the different materials from which pipette tips and a pipette tip carrier are formed. Such methods are highly sensitive to variations in the intensity, colour and distribution of ambient lighting since each of these parameters will affect the brightness of a particular material perceived by the detector. This weakness is inherent to these methods since the system must be illuminated in order for the comparison to be made. Furthermore, the method of US-A-2017/0269115 relies on the pipette tips and the pipette tip carrier being made of particular materials. The detector would require recalibration if different materials were used since it relies on particular empirical threshold values of brightness to detect pipette tips. The use of a pipette tip carrier assembly in accordance with the present invention overcomes these limitations since the presence of pipette tips can be determined based solely on the detection of light from the light source. The relative optical properties of the materials of the pipette tips and the holding elements do not need to be accounted for, and the ability of a detector to detect the presence or absence of pipette tips will not be dependent on the ambient lighting conditions since the ambient light will not affect whether light from the light source is received by the detector.

The pipette tip carrier assembly is typically provided at a storage area of a biochemical analyser. In use, a robot would thus collect pipette tips that are held by the holding elements and transport them to the location of a substrate (such as a biochip) in the biochemical analyser, after which the pipette tips would be used to dispense liquid samples onto the substrate.

Pipette tips of the kind used in biochemical analysers typically have the approximate form of cylinder narrow, elongate cone or cylinder. (The invention is, of course, suitable for use with elongate pipette tips of all forms and dimensions.) To hold such a pipette tip in an orientation such that its elongate dimension is parallel to the first axis means that the dimension of the pipette tip along which the pipette tip has its greatest length is substantially parallel to the first axis. Since each holding element is adapted to hold a respective pipette tip oriented substantially along the first axis, each pipette tip held by a respective holding element of the pipette tip carrier assembly is (in the case that there is more than one holding element) substantially parallel to every other pipette tip held by the other holding elements of the pipette tip carrier assembly.

Preferably each holding element comprises an open portion through which the respective pipette tip extends in use. The light from the light source can pass through the opened portion when the holding element is vacant (i.e. when it is not holding a pipette tip), which can be detected in order to infer that the holding element is vacant. When the holding element is occupied (i.e. when it is holding a pipette tip), the held pipette tip will attenuate and/or scatter the light incident on it and reduce the flux of light through the opened portion of the holding element in relation to when the holding element is vacant. This relative reduction in the flux of light passing through the opened portion can be detected in order to infer that the holding element is occupied.

Preferably the pipette tip carrier assembly comprises a plurality of holding elements arranged in an array extending in at least one dimension. The array could simply be a one-dimensional array, in which the plurality of holding elements in the array would be aligned along a single direction. In particularly preferred embodiments the array is a two-dimensional array. This means that two or more of the plurality of holding elements are arranged in a common plane. In particularly preferred embodiments the two-dimensional array lies in a plane perpendicular to the first axis. In other words, each of the plurality of holding elements in the array is arranged to intersect a plane that lies perpendicular to the first axis.

Where the pipette tip carrier assembly comprises a plurality of holding elements arranged in an array, the one or more holding elements in the array are preferably regularly spaced along at least one of a second axis perpendicular to the first axis and a third axis perpendicular to the first axis and the second axis. As a result the holding elements will be regular spaced along at least one direction.

Preferably each holding element is formed by a respective open portion in a frame, the position of each hole in the frame corresponding to a respective location in the two-dimensional array. In alternative embodiments the holding elements could each be provided as, for example, a clip or clamp adapted to securely hold a respective pipette tip. In particularly preferred embodiments, the frame is formed of an opaque material. An advantage of this is that the opaque frame can block light travelling along the first axis between holding elements. This means that light will only be received from positions corresponding to the holding elements (i.e. the holes) that are not holding pipette tips and not from the surrounding area. This improves the reliability with which the presence of pipette tips can be detected since it increases the contrast between the vacant holding elements and the surrounding parts of the pipette tip carrier assembly, and reduces the likelihood of false detections being made since light will not be reach the detector from parts of the frame at which holding elements (i.e. holes in the frame, in these embodiments) are not present.

In preferred embodiments each holding element is formed by a respective hole in a frame, the position of each hole in the frame corresponding to a respective point of the two-dimensional array. The frame could be, for example, a flat plate with a number of through-holes, each adapted to hold a pipette tip, formed in the frame so as to define the array of holes. This arrangement is particularly suitable for implementation in biochemical analysers that employ robots adapted to collect pipette tips from the pipette tip carrier assembly in a regular arrangement. In such embodiments the regular spacing of the holes in the frame could be chosen so as to match the configuration of the robot.

In preferred embodiments the light source comprises one or more light-emitting elements. The light-emitting elements produce the light that is directed by the light source towards each of the one or more holding elements. The light source can comprise additional features, for example a waveguide (such as a fibre-optic cable) or reflector(s) arranged to cause light produced by the light-emitting elements to be directed along the first axis. As such it is not essential that the light-emitting elements are positioned in line with the one or more holding elements along the first axis. However, in some embodiments the light-emitting elements will be positioned in line with the one or more holding elements along the first axis so as to illuminate the one or more holding elements without requiring the light from the light-emitting elements to be redirected.

Preferably each of the one or more light-emitting elements is configured to be electrically powered. Electrically-powered light sources are preferable since they are easily controlled and can provide a reliable output of light. In particularly preferred embodiments, each of the one or more light-emitting elements comprises a light-emitting diode (LED). LEDs serve as a reliable and steady source of light with a predictable spectral profile and as such allow a detector to be precisely calibrated to detect light produced by them. Preferably the one or more LEDs are disposed on a printed circuit board (PCB) configured to power the one or more LEDs. The PCB could be adapted to have dimensions matching the arrangement of the holding elements, and LEDs disposed on the PCB in a uniform arrangement could provide a homogenous illumination across the space in which the holding elements are arranged.

Preferably the light source comprises a light-dispersing element arranged to intersect the path of light travelling from the one or more light-emitting elements towards the one or more holding elements. The light-dispersing element is adapted to disperse light that is incident on it. Dispersing the light directed towards the holding elements by the light source in this way increases the uniformity and smoothness of the illumination across the holding elements. It also prevents the occurrence of certain optical effects (for example lens flare) to which a detector would be susceptible when exposed to a concentrated, bright light source such as an LED. This assists the reliable detection of pipette tips since it reduces the degree of variation in the intensity of light received from the vacant holding elements. Preferably the light-dispersing element comprises a translucent screen arranged to intersect the path of light travelling from the light source to the openings of the one or more holding elements. Light can pass through a translucent screen but is typically scattered as it does so. As a result, light from a concentrated source such as an LED will be dispersed after passing through the translucent screen. The light-dispersing element could be provided in other forms, however—for example, individual light-dispersing coverings could be arranged over each light-emitting element of the light source.

Preferably the pipette tip carrier assembly further comprises a container arranged to enclose the light source and having an opening bounded by an edge of the container whereby the one or more holding elements are supported. In such embodiments the light source and the holding elements can be provided as an self-contained unit. This is not, however, essential. For example, the light source could be integral fixed part of a biochemical analyser while the holding elements and container could be provided as a separate, self-contained unit (or units). In particularly preferred embodiments the container is formed of an opaque material. An opaque container that encloses the light source prevents light from sources other than the light source (for example ambient light) from illuminating the holding elements along the first axis, thereby preventing light from such sources contributing to variations in the levels of light seen by a detector (and thus improving the reliability of detection of pipette tips). This benefit is enhanced when the holding elements are formed by holes in an opaque frame as described above. The container preferably comprises: a base arranged distal to the light source and the one or more holding elements along the first axis; and a wall extending along the first axis from the base towards the one or more holding elements, the one or more holding elements being supported by an upper edge of the wall. Thus the container, light source and holding elements can be provided as self-contained unit. This allows the pipette tip carrier assembly to be removed from a biochemical analyser for, for example, restocking with pipette tips, cleaning or maintenance. In particularly preferred embodiments the light source is connected to the base of the container.

A second aspect of the invention provides a pipette tip carrier assembly for storing elongate pipette tips in a biochemical analyser, the pipette tip carrier assembly comprising:
- a frame comprising an array of holding elements each adapted to hold, in use, a respective pipette tip such that the elongate dimension of the held pipette tip is parallel to the first axis;
- a container which comprises at least one opening configured to hold the frame such that in use the held pipette tips extend through the frame into the container;
- wherein the container and the frame comprise cooperating parts that together define a restraining structure configured to restrict the movement of the frame along the first axis when held at the opening of the container.

The provision of a frame separate from the container as define above allows access to the interior of the container, for example for cleaning and maintenance. However, when a pipette tip is removed from the frame, for example by a robot in a pipette tip storage system (which could be part of an automated biochemical assay platform), the frame may be displaced by the movement of the pipette tip, and can even be lifted with the pipette tip if the pipette tip has been urged into the hole in such a way that creates an interference fit between the pipette tip and the hole. (This may occur in particular in systems where the pipette tips are collected by a robot, as the robot may need to press a pipette into the pipette tip while the pipette tip is in the frame in order to secure the pipette tip to the pipette.) This can result in downtime while the frame is replaced, and can cause damage to the system or analyser if the frame is subsequently dropped onto other parts of the analyser. By restricting movement of the frame along the first axis, the restraining structure prevents the frame from being removed from the pipette tip carrier assembly in this way.

The restraining structure preferably comprises a flange provided by the container under which the frame can be moved when held at the opening of the container. The frame can thus be moved laterally (in the plane perpendicular to the first axis) into place under the flange. One or more such flanges can be arranged to cover an edge (or edges) of the frame when the frame is held at the opening. The restraining structure could alternatively be defined by a feature of the frame. For example, a lip or flange connected to the frame could be adapted to cooperate with a respective edge of the container or opening of the container so as to prevent movement of the frame along the first direction when the frame is held in the opening.

In preferred implementations the pipette tip carrier assembly comprises a locking mechanism which, when in an engaged state, secures the frame in place. The locking mechanism may secure the frame in place under the flange, if the flange is provided. Preferably the locking mechanism is also adapted to restrict movement of the frame in the plane parallel to the first axis when in the engaged state. This improves the ability of the pipette tip carrier assembly to prevent movement of the frame while pipette tips are being added to and removed from the frame, for example during a biochemical assay or when rearranging the stored pipette tips into an optimal configuration. Furthermore, preventing lateral movement of the frame ensures that the position of the held pipette tips is easily predictable and promotes reliable collection of pipette tips by a robot in a system in which the pipette tip container assembly is implemented. Where a flange of the kind described above is provided, the locking mechanism preferably urges the frame into place under the flange when in the engaged state. In this way, the locking mechanism and flange can cooperate in order to restrict the movement of the frame in all three spatial directions.

In preferred embodiments, the locking mechanism comprises a rotatable cam adjacent to the opening of the container, wherein the rotatable cam can be rotated between an engaged position and a disengaged position; and wherein the rotatable cam is configured to urge the frame into the restraining structure when rotated into the engaged position. The locking mechanism can hence be brought into and out of engagement simply by turning the cam (for example by turning a connected knob or other such feature). Alternatively, the locking mechanism could be arranged to slide towards and away from the restraining structure such that moving the locking mechanism along the appropriate direction urges the frame towards the restraining structure. Where the locking mechanism does comprise a rotatable cam as described above, the rotatable cam may advantageously be configured such that the frame can be released from the restraining structure when the rotatable cam is rotated into the unlocked position. This allows the frame to be removed for cleaning, for example, and to provide access to the interior of the container (for example for maintenance and cleaning).

The locking mechanism preferably comprises one or more protrusions, each of which covers one or more respective reference holes in the container and/or frame when the locking mechanism is in one of the locked state and the unlocked state, and does not cover the one or more reference holes when in the other of the engaged state and the disengaged state. Light from a light source inside the container (which is a feature in particularly preferred embodiments, as will be described later) will be visible at the positions of the reference holes when the locking mechanism is in one of the engaged and disengaged states, and not visible when in the other of the engaged and disengaged states. This allows a detector to detect light from the reference holes in order to determine which state the locking mechanism is in. This is advantageous when the pipette tip carrier system is used as part of a pipette tip storage system in which a detector is used to detect light from the light source, since it will be possible for the detector to determine which state the locking mechanism is in based on the appearance of light at the reference holes. Pipette tip storage systems in accordance with aspects of the invention will be described later.

Where the locking mechanism includes a rotatable cam of the kind defined above, the one or more protrusions are preferably mechanically connected to the rotatable cam such that the rotatable cam rotates as the one or more projecting features are moved. The protrusions could be any features that move with respect to the reference holes as the cam is rotated. For example, the protrusions could be ends of an elongate knob or handle, or tabs attached to such a feature. More preferably, the rotatable cam and the one or more projecting features are integral with one another. The locking mechanism can thus be provided by a single integral unit that is capable of both restricting lateral movement of the frame and also indicating the state of the mechanism to a detector.

Pipette tip carrier assemblies in accordance with the second aspect of the invention preferably comprise a light source arranged to direct light towards the holding elements and, if provided, the one or more reference holes, from within the container. This has the advantages described above in connection with the light source that is provided as part of the first aspect of the invention, and provides additional benefits as described above where reference holes are provided. Light sources suitable for use in implementations of the first aspect are also suitable for embodiments of the second aspect—for example, a printed circuit board with an array of LEDs as described above could be used. A diffusing element (for example a translucent screen) could also be provided, and this would have the same advantages as are discussed above.

Where a light source as defined above is provided, the second aspect of the invention also provides a pipette tip storage system comprising: a pipette tip carrier assembly in accordance with the second aspect, further comprising the light source; and a detector arranged outside of the container and configured to detect light from the light source exiting the container via the array of holes and the one or more reference holes. The detector is therefore able to determine whether each holding element in the frame is occupied, as was explained above, and also whether the locking mechanism is in the engaged state, if reference holes are present (based on the detection of light from the reference holes).

In accordance with a third aspect of the invention there is described a pipette tip storage system comprising: a pipette tip carrier assembly in accordance with the first or second aspect; and a detector positionable such that the one or more holding elements lie between the light source and the detector, the detector being adapted to detect, in use, light from the light source not intercepted by pipette tips held by the pipette tip carrier assembly.

Preferably the detector comprises a camera. In a particularly preferred embodiments the detector comprises a charge-coupled device (CCD) adapted to detect light received thereby from the light source. The CCD could be in a digital camera, for example.

In accordance with a fourth aspect of the invention there is provided a biochemical analyser comprising a pipette tip storage system in accordance with the third aspect.

BRIEF DESCRIPTION OF THE DRAWINGS

An example will now be described with reference to the accompanying drawings, in which.

DETAILED DESCRIPTION

Figure 1:
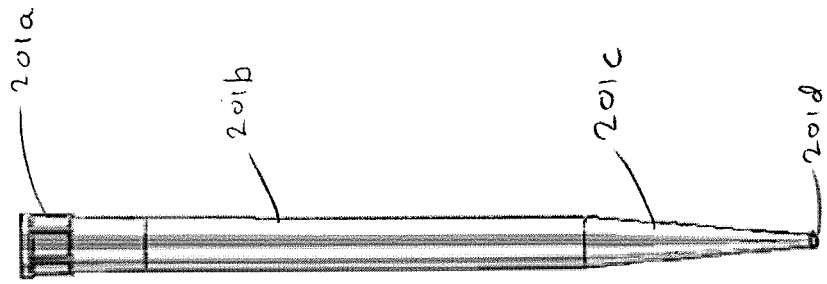
FIG. 1 shows a pipette tip suitable for use with pipette tip carrier assemblies in accordance with the first and second aspects of the invention.
Figure 1:

FIG. 1 shows a pipette tip 201 suitable for use with a pipette tip carrier assembly in accordance with the first aspect of the invention. The pipette tip 201 has an elongate form with a circular cross-section. The pipette tip 201 has a hollow interior that is adapted to hold a liquid sample for use in a biochemical assay. The pipette tip 201 includes a central portion 201b. At one end of the pipette tip 201 is a shoulder 201a, which is wider in diameter than the central portion 201b. The shoulder 201a surrounds an opening in the end of the pipette tip 201. At the end opposite the shoulder 201a is a tapered portion 201c. At the end of the tapered portion 201c is an opening 201d through which a liquid sample can be drawn into the pipette tip 201 and through which the liquid sample can be dispensed (onto the surface of a chemically active substrate in an assay, for example). In a typical biochemical the pipette tip 201 a robot would collect and hold the pipette tip 201 by the shoulder 201a.

Figure 2:
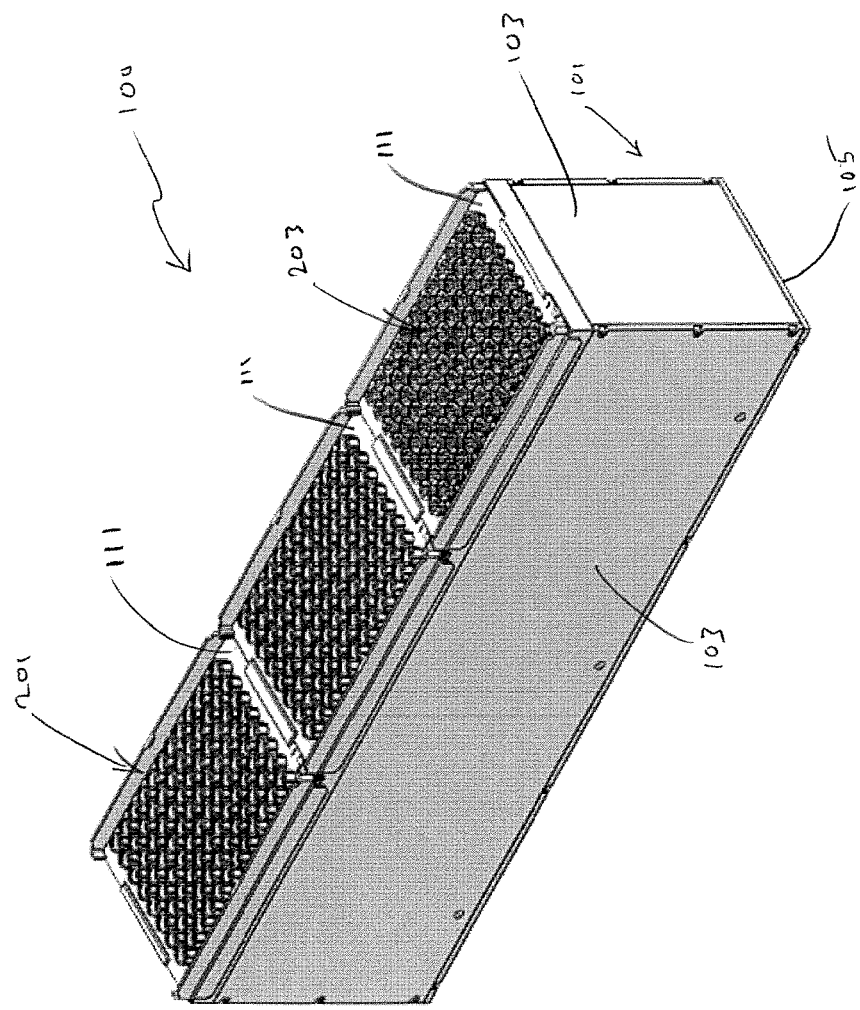
FIG. 2 is a perspective view of an embodiment of a pipette tip carrier assembly in accordance with the first aspect of the invention.
Figure 2:
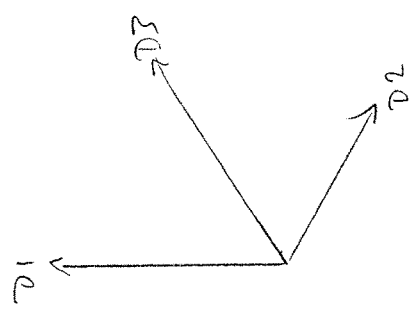

FIG. 2 shows an embodiment of a pipette tip carrier assembly 100 in accordance with the first aspect of the invention. Also shown are pipette tips 201, 203 in situ (i.e. being held by the pipette tip carrier assembly 100).

In this example the pipette tip carrier assembly 100 includes a rectangular container 101. The container 101 includes side walls 103 and a base 105.

In this example the pipette tip carrier assembly 101 includes three frames 111. Formed in each frame 111 are a number of holes 115 (shown most clearly in FIG. 4) arranged in a regular two-dimensional array. Each hole 115 is approximately circular, with its dimensions matching those of a respective pipette tip 201, 203 that the hole 115 is adapted to hold. Each hole 115 (together with the portion of the frame 111 in which the hole 115 is formed) thus serves as a holding element suitable for holding a pipette tip 201, 203. While in this example the frame 111 is adapted to hold the pipette tips 201, 203, alternative embodiments could employ other means for holding the pipette tips 201, 203 (for example clips or clamps adapted to securely grip pipette tips 201, 203).

In this example pipette tips 201 of the kind shown in FIG. 1 are held in the two of the frames 111. The shoulder 201a of each pipette tip 201 is wider than the holes 115, while the central portion 201b and the tapered portion 201c are sufficiently narrow so as to be able to pass through the holes 115. Each pipette tip 201 can thus be inserted through a respective hole 115 and supported in the frame 111 by its shoulder 201a.

This example shows a second kind of a pipette tip 203. The pipette tips 203 are similar in form to the pipette tips 201 in that each pipette tip 203 has a hollow interior and includes a shoulder that surrounds an opening in the end of the pipette tip 203, a central portion, and a tapered portion at the end of which is an opening through which a liquid sample can be dispensed. The pipette tips 203 are, however approximately, half the length (along their elongate dimension) of the pipette tips 201. The pipette tips 203 are therefore capable of containing less liquid than the pipette tips 201 but are nonetheless suitable for use in the pipette tip carrier assembly 100.

Each pipette tip 201, 203 held by a frame 111 is oriented along a first axis D1. The holes 115 are arranged regularly along a second axis D2 and a third axis D3, which are each perpendicular to the first axis D1 and to each other.

Figure 3:
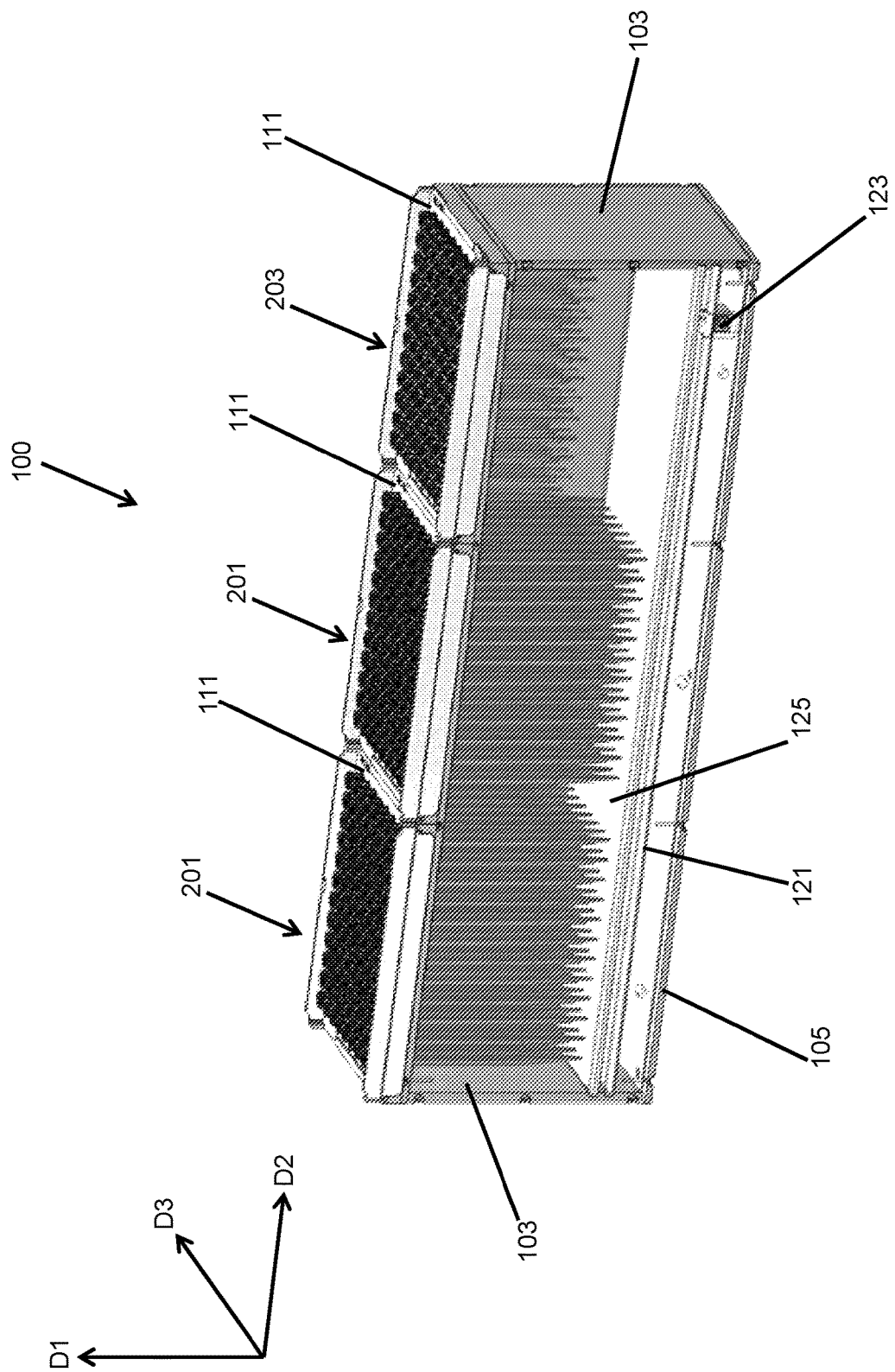
FIG. 3 is a perspective view of the pipette tip carrier assembly of FIG. 2 with one side wall removed.

FIG. 3 shows the pipette tip carrier assembly 100 of FIG. 2 with one side wall 103 removed so as to reveal the interior of the pipette tip carrier assembly 100. The pipette tips 201, 203 extend through the frames 111 into the interior of the container 101.

Arranged inside the container above the base 105 is a light source 121. In this example the light source 121 is a printed circuit board (PCB) with a plurality of light-emitting diodes (LEDs) arranged on its upper surface (i.e. the side that faces the frames 111). The PCB is configured to power the LEDs. In this example the LEDs are configured to emit in the green region of the visible spectrum, but any other wavelength suitable for detection by a suitable detector could be chosen.

A light-dispersing element in the form of a translucent screen 125 is arranged above the PCB of the light source 121 and lies between the light source 121 and the frames 111. The PCB is electrically powered via a power inlet 123. The translucent screen 125 disperses light from the LEDs, which increases the uniformity with which the frames 111 are illuminated since the light source 121 will appear as a relatively homogenous glow rather than a series of point sources.

In this example the dimensions of the container 101 are such that the distance between the frames 111 and the translucent screen 125 along the first axis D1 is slightly greater than the length of the pipette tips 201. As a result, the pipette tips 201 are suspended above (and not in contact with) the translucent screen 125 by the frames 111 in which they are held. In other examples, however, the pipette tips 201 could be in contact with the translucent screen 125.

In this example the side walls 103 and the base 105 of the container 101 are made of an opaque material. The frames 111 are also made of an opaque material. As a result, light from the light source 121 can only pass out of the container 101 via the holes 115. This ensures that the flux of light seen at each vacant hole 115 is not affected by the ambient light conditions and thus allows the presence of pipette tips 201, 203 to be detected reliably.

Figure 4:
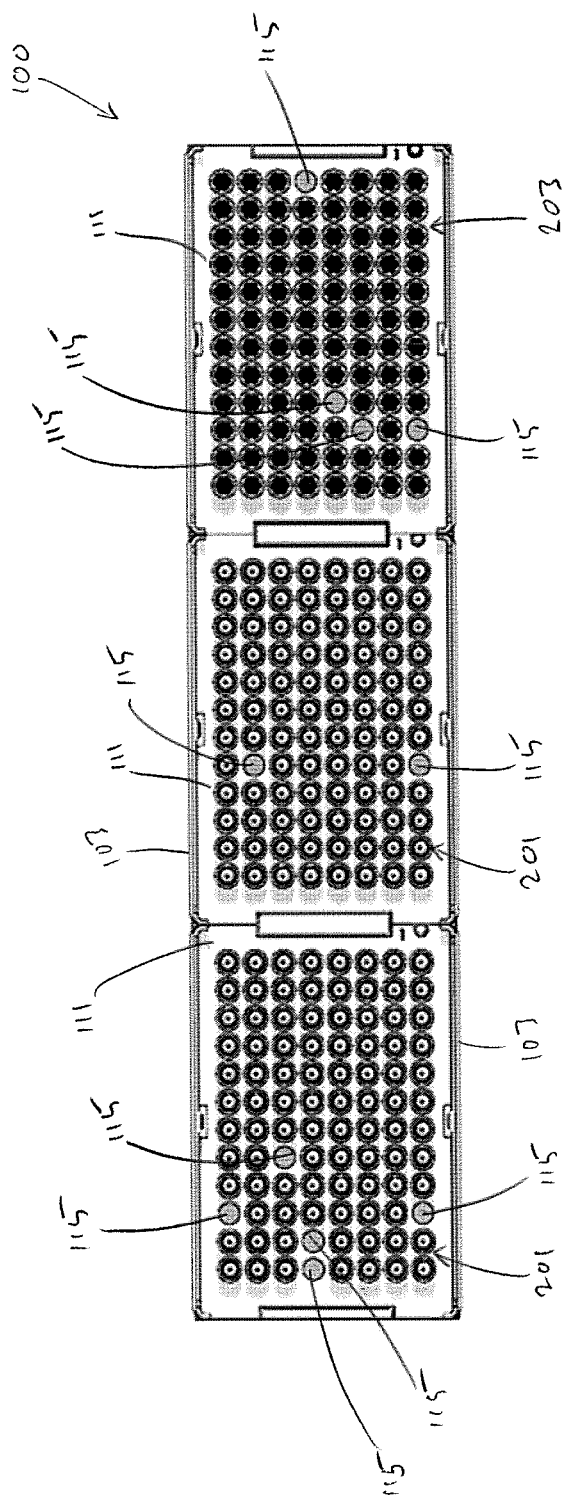
FIG. 4 is a plan view of the pipette tip carrier assembly of FIGS. 2 and 3.
Figure 11:
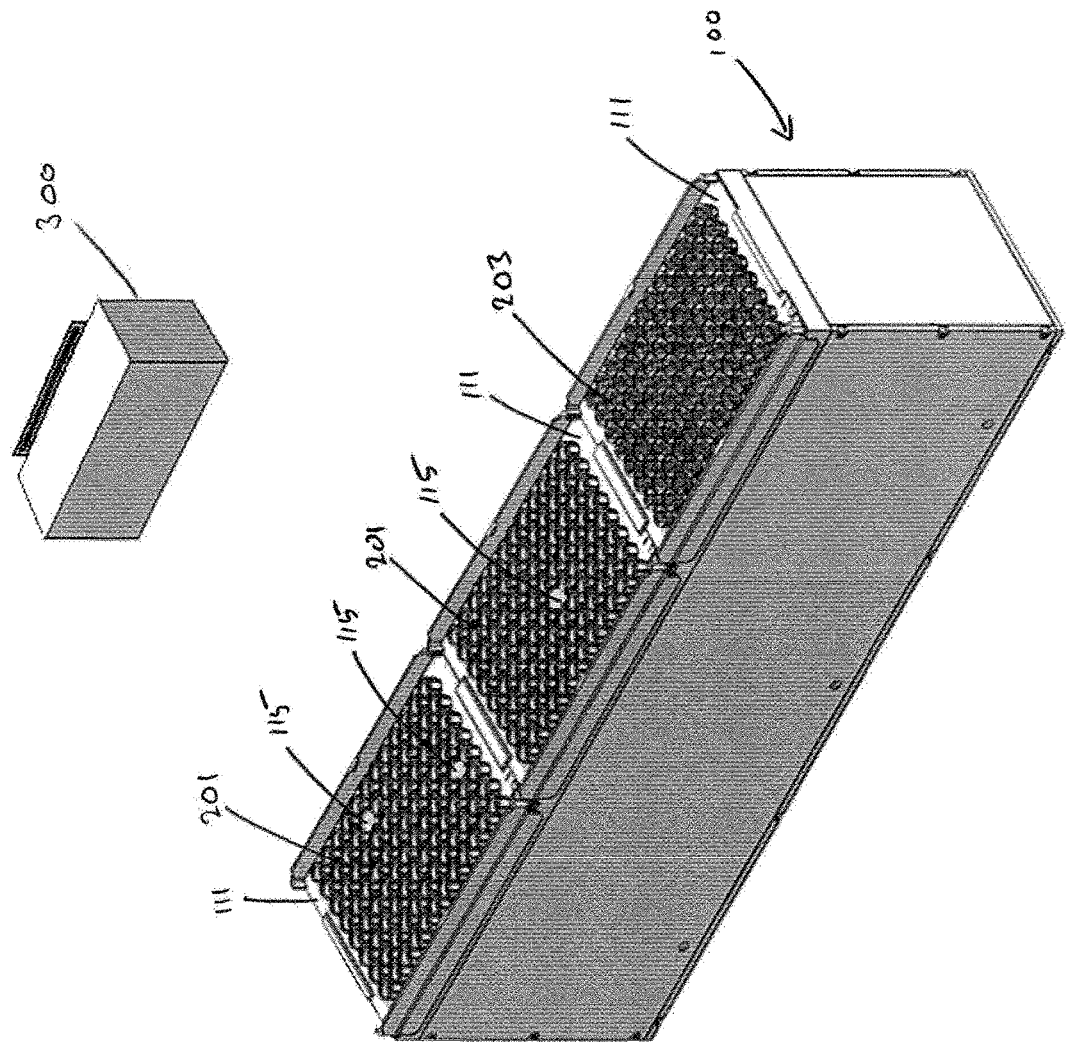
FIG. 11 is a perspective view of an embodiment of a pipette tip storage system in accordance with the third aspect of the invention.

FIG. 4 is a plan view of the pipette tip carrier assembly 100 as viewed from above (along the first axis D1). This perspective is representative of what would be seen by a detector (an example of which is illustrated in FIG. 11) arranged to detect the presence of pipette tips. In FIGS. 2 and 3 each hole 115 is occupied by a respective pipette tip 201, 203, but in FIG. 4 some of the holes 115 are vacant. Light can escape the container 101 at the positions of each vacant holes 115. The detector would thus record bright spots at the position of each vacant hole 115. The pipette tips 201, 203 attenuate and scatter a substantial proportion of the light incident on them, and as a result very little light escapes the container 101 via holes 115 that are occupied by pipette tips. The detector will thus record a much lower (if not zero) flux of light from the light source 121 at the positions of the occupied holes 115 in relation to the vacant holes 115.

Figure 5:
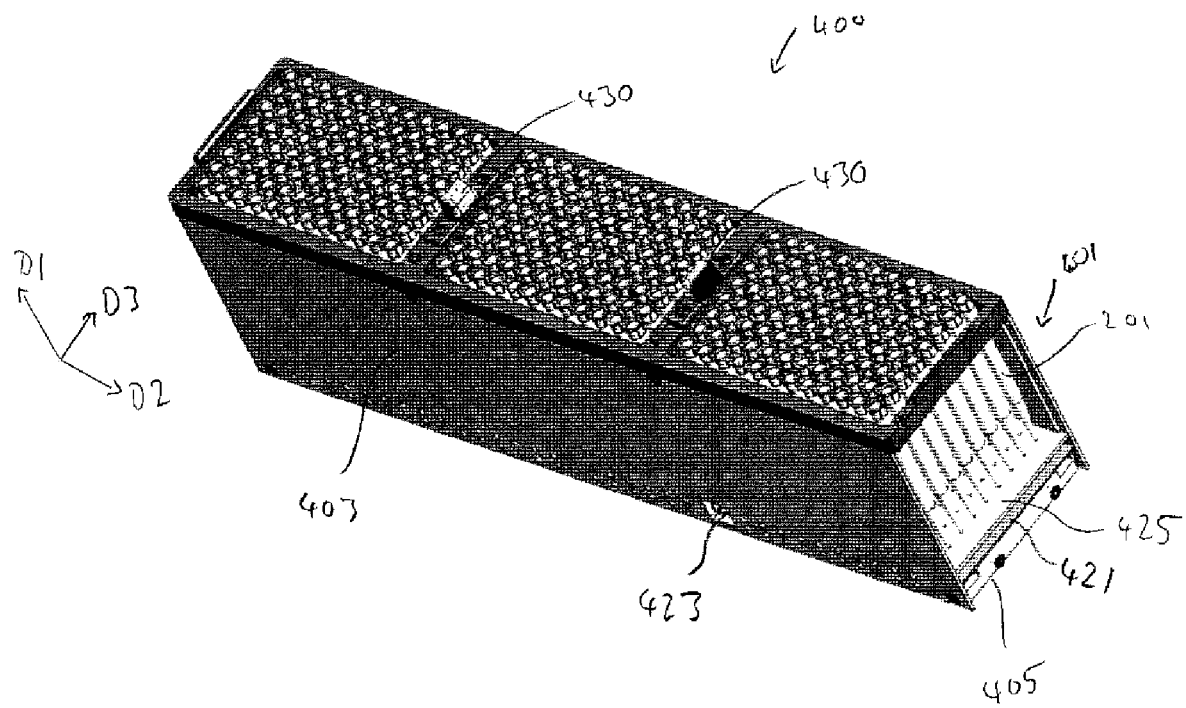
FIG. 5 is a perspective view of an embodiment of a pipette tip carrier assembly in accordance with the second aspect of the invention.
Figure 6:
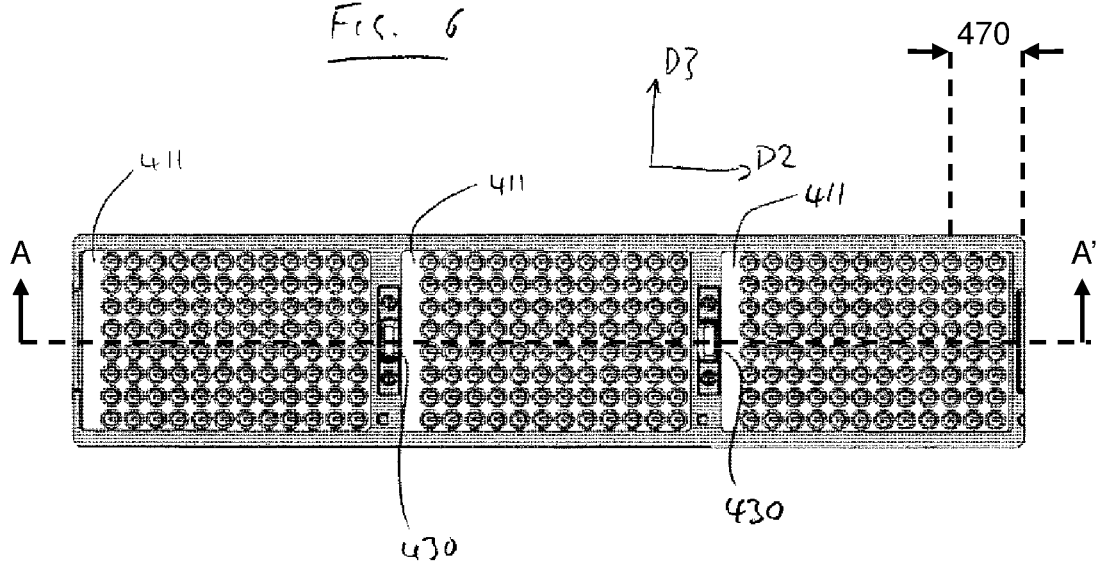
FIG. 6 is a plan view of the pipette tip carrier assembly of FIG. 5.

FIGS. 5 and 6 illustrate a pipette tip carrier assembly 400 in accordance with an embodiment of the second aspect of the invention. Like the pipette tip carrier assembly 100 shown described above, the pipette tip carrier assembly 400 includes a container 401, which has side walls 403 and a base 405. The pipette tip carrier assembly 400 also includes three frames 411 (best seen in FIG. 6), each of which is held at a respective opening of the container. Pipette tips 201 of the kind described above are held in holding elements provided by the frame, which in this case are holes formed in the frame (and in this example have the same structure and regular arrangement as the holes in the frame 111 described above).

Figure 7:
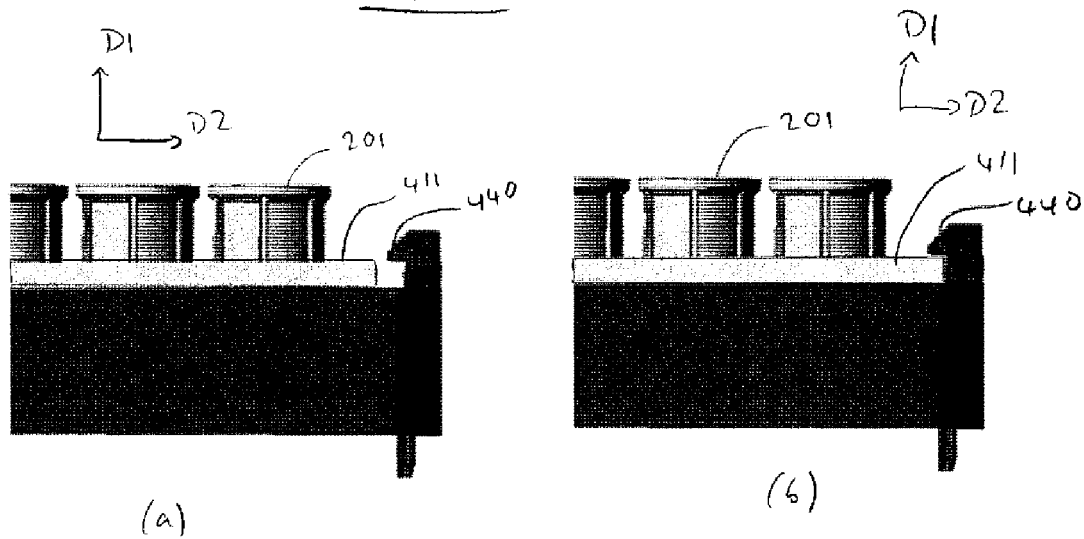
FIG. 7 is a cross-sectional view of a restraining structure incorporated in the pipette tip carrier assembly of FIGS. 5 and 6.

FIG. 7 shows a cross-sectional view of part of the pipette tip carrier assembly 400 of FIGS. 5 and 6. The cross-section is taken along the line A-A' shown in FIG. 6 and the portion of the container labelled 470 is shown. The container 401 provides a flange 440, which is positioned at the edge of the opening at which the frame 411 is held. The flange extends parallel to the edge of the opening along the third axis D3, and projects towards the opening along the second axis D2. The flange 440 is positioned at a height above the opening along the first axis D1 such that the frame 411 is able to move under the flange 440, as shown in FIG. 7(b). When the frame 411 is under the flange 440, its movement along the first axis D1 is restricted. The flange 440 thus defines a restraining structure that prevents movement of the frame along the first axis D1.

Figure 8:
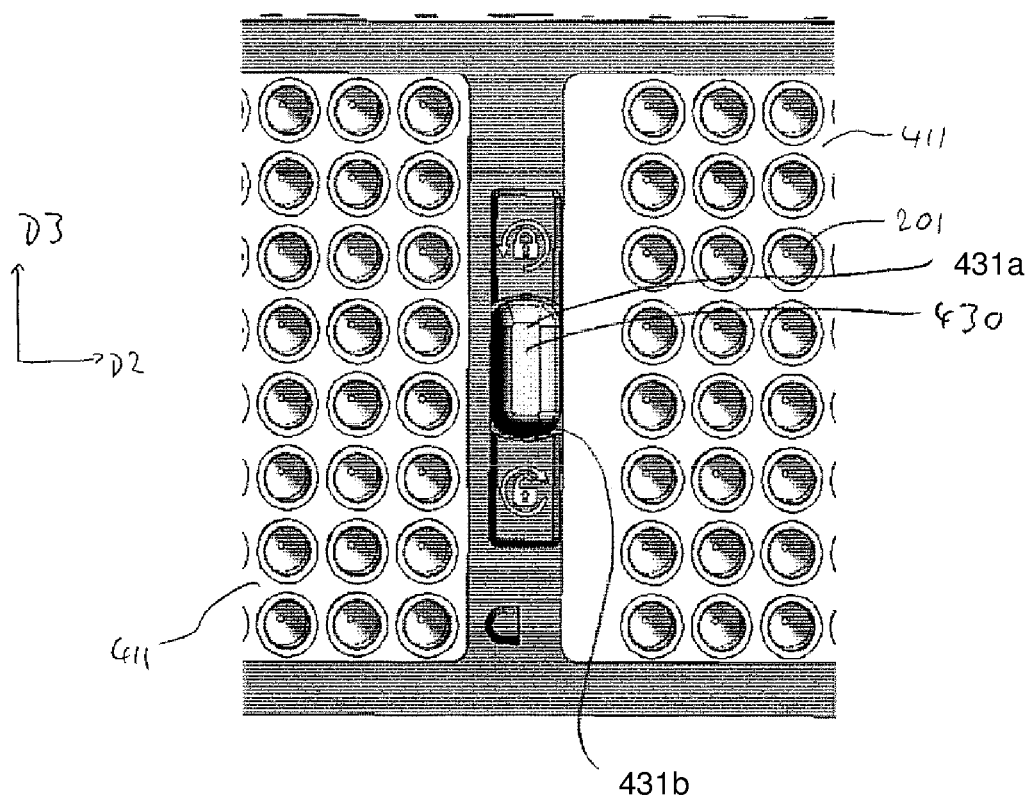
FIG. 8 is a plan view of a locking mechanism in the pipette tip carrier assembly of FIGS. 5 to 7 in an unlocked state.
Figure 10:
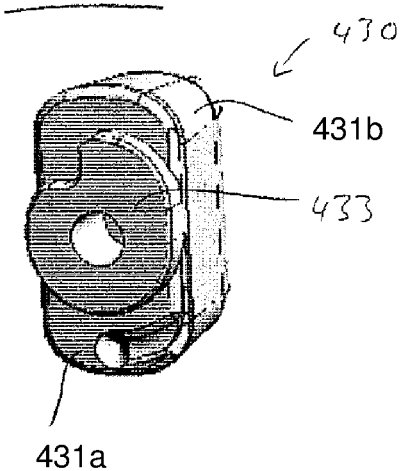
FIG. 10 shows a rotatable knob that is part of the locking mechanism in the pipette tip carrier assembly of FIGS. 5 to 9.

FIG. 8 shows a detailed plan view of part of the pipette tip carrier assembly 400 of FIGS. 5 to 7. The pipette tip carrier assembly 400 includes a locking mechanism that is provided by a knob 430. The knob 430 is located on the side of the frame 411 opposite to the flange 440 described above. As is best shown in FIG. 10, the knob 430 has a drop cam 433 (sometimes referred to as a "snail cam") on its underside. Other types of cam could also be used, for example a pear-shaped cam or eccentric cam. The knob 430 is arranged such that the drop cam 433 lies in the plane of the frame 411 such that the locking mechanism 430 is configured to engage.

Figure 9:
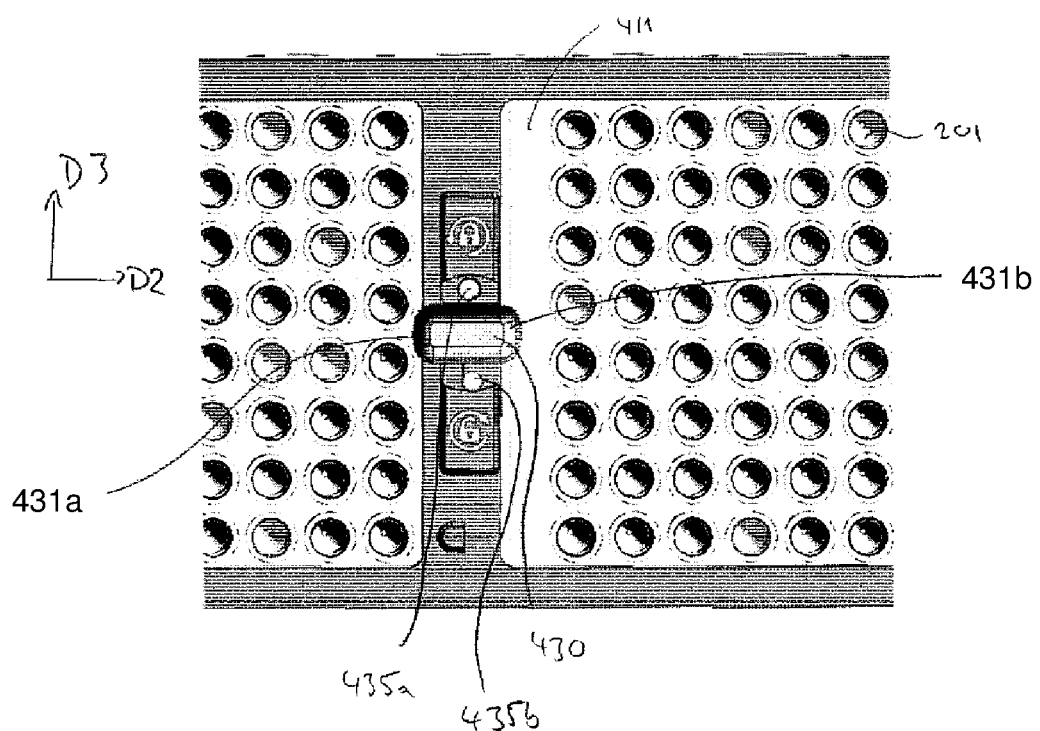
FIG. 9 is a plan view of a locking mechanism in the pipette tip carrier assembly of FIGS. 5 to 8 in a locked state.

In FIG. 8, the locking mechanism is in an unlocked state. In this example, when the knob 430 is rotated in the anticlockwise direction, the drop cam 433 engages the frame 411 and urges the frame along the second axis D2 into place under the flange 440. The drop cam 433 is configured such that the frame 411 is urged fully into place under the flange 440 (as shown in FIG. 7(b)) when the knob 430 is rotated about 90 degrees anticlockwise from the unlocked state, as is shown in FIG. 9. When the locking mechanism is in the locked state, lateral movement of the frame 411 along the second axis D2 and third axis D3 is restricted, since the drop cam 433 continues to urge the frame 411 into place under the flange 411.

FIG. 9 shows the knob 430 in the locked state. The knob 430 in this example has an elongate form, and its two ends 431a, 431b move about the centre of the knob 430 as it is turned between the unlocked and locked states. As is shown in FIG. 9, the container 411 includes two reference holes 435a, 435b. The reference holes 435a, 435b are covered by the ends 431a, 431b of the knob 430 when in the unlocked state but are uncovered when the knob 430 is rotated into the locked state. Light from the light source 421 will therefore be visible through the reference holes 435a, 435b when the knob 430 is in the locked state, but not when in the unlocked state. Each end 431a, 431b of the knob thus provides a projecting feature that covers a respective reference hole 435a, 435b when the locking mechanism is in the unlocked state and does not cover the respective reference hole 435a, 435b when in the locked state. In a pipette tip storage system (examples of which will be described later), the detection of light from the reference holes 435a, 435b can provide confirmation that an automated process involving the removal of pipette tips from the frame 411 may commence.

FIG. 11 shows an embodiment of a pipette tip storage system in accordance with the fourth aspect of the invention. This exemplary pipette tip storage system includes a pipette tip carrier assembly 100 of the kind illustrated in FIGS. 2-4 and a detector 300 positioned above the pipette tip carrier 100 along the first axis D1. The pipette tip storage system may, however, include a pipette tip carrier assembly of the kind shown in FIGS. 5-10 and operate in the manner described below. The detector 300 includes a digital camera (not shown) that is arranged to face the pipette tip carrier assembly 100.

The detector 300 is connected to a Cartesian robot (not shown) that is controllable so as to move the detector 300 along the first, second and third axes D1, D2, D3 independently. Although this example shows only one pipette tip carrier assembly 100, a pipette tip storage assembly could be provided with a plurality of pipette tip carrier assemblies 100, and in such embodiments the Cartesian robot could be controlled to move the detector 300 between the pipette tip carrier assemblies so as to detect the presence of pipette tips 201, 203 in each pipette tip carrier assembly 100 separately.

In order to detect the presence of pipette tips 201, 203 in the pipette tip carrier assembly 100, the detector 300 can record an image (using the camera) of the pipette tip carrier assembly 100. The detector 300 can then divide the image into a grid having a plurality of cells each corresponding to a respective hole 115 and, by the application of a suitable parameter (for example the power or total flux received from the part of the grid corresponding to each respective hole 115), determine whether a pipette tip 201, 203 is present in each hole. For example, the detector 300 could record the intensity of light received within each cell (i.e. from each hole 115) at the time of taking the image and compare these values to a predetermined threshold. If the intensity of light received from a particular hole 115 is below the threshold, the detector 300 could infer that the hole 115 is occupied by a pipette tip 201, 203, and otherwise it would conclude that the hole 115 is vacant. The number of cells not exceeding the threshold could be counted in order to determine the number of holes 115 that are occupied (and hence determine the total number of pipette tips 201, 203 in the pipette tip carrier assembly 100). In the example shown in FIG. 11, three holes 115 are vacant and all of the other holes 115 are occupied by pipette tips 201, 203.

If a pipette tip carrier assembly 400 of the kind shown in FIGS. 5-10 is provided, the detector 300 could also be configured to measure light from the reference holes 435a, 435b. A robot may be used to collect pipette tips from the pipette tip carrier assembly 400, and the detector 300 may be configured to command the robot not to collect pipette tips unless light from the reference holes 435a, 435b is visible.

Figure 12:
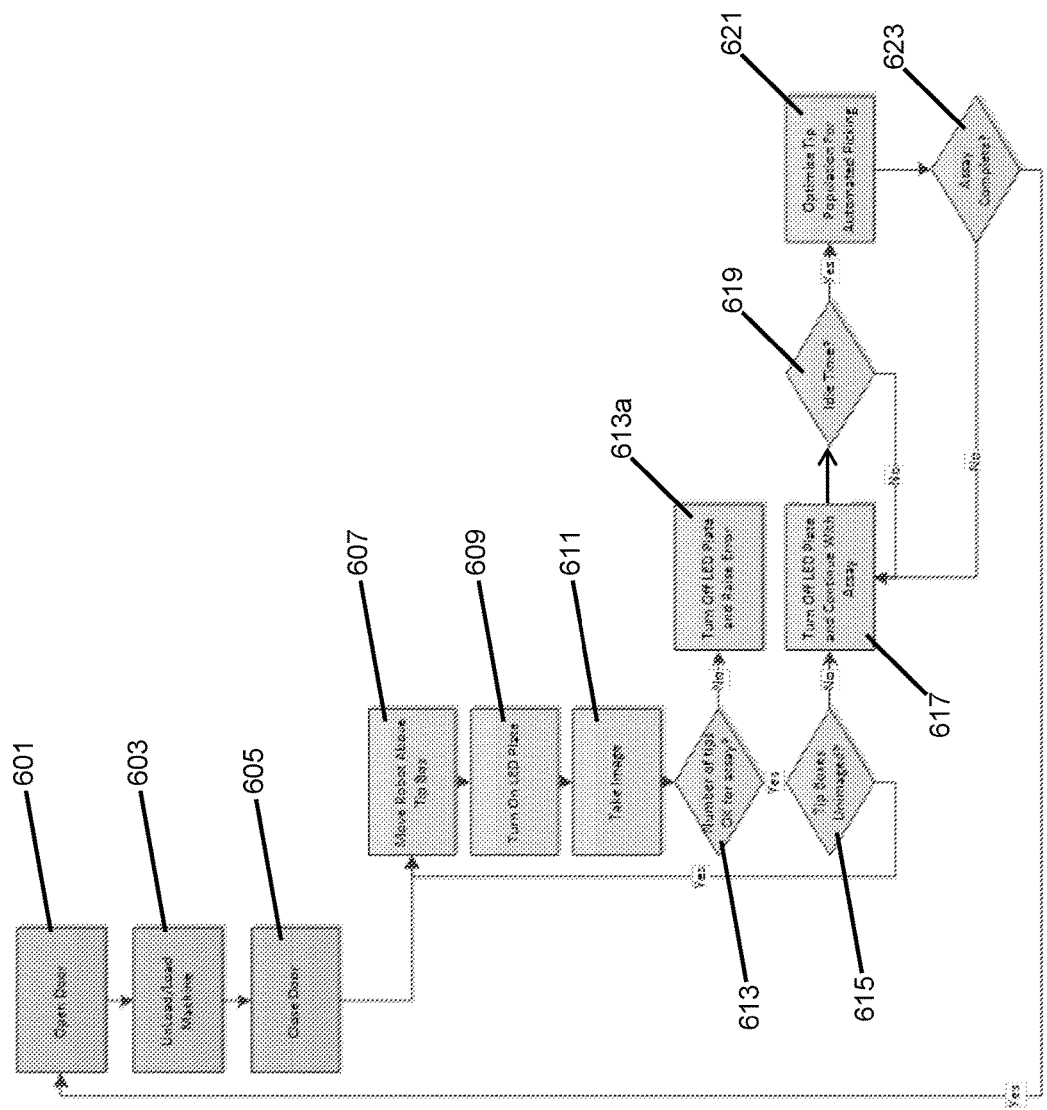
FIG. 12 is a flow diagram of a process for detecting the presence of pipette tips and optimising their arrangement in pipette tip carrier assemblies in accordance with the first and second aspects of the invention.

FIG. 12 shows a flow diagram illustrating an exemplary process for detecting the presence of pipette tips in a pipette tip carrier assembly and for managing their arrangement in the pipette tip carrier assembly. This process will be described as being performed in a biochemical analyser incorporating pipette tip carrier assemblies 100 and pipette tips 201, 203 of the kind shown in FIGS. 2-5, though it will be appreciated that the process could be adapted for use with any pipette tip carrier assembly in accordance with the first or second aspect of the invention.

At step 601 a door of the biochemical analyser adapted to incorporate pipette tip carrier assemblies 100 is opened. The door provides access to the interior of the analyser and allows the pipette tip carrier assemblies 100 to be loaded into the analyser and unloaded from it. At step 603 one or more pipette tip carrier assemblies 100 are loaded and/or unloaded in the analyser and at step 605 the door is closed.

Steps 601, 603 and 605 may be performed by a human operator, or could be partially or wholly automated (for example by the user of a robot configured to transport pipette tip carrier assemblies 100 to and from the analyser). Steps 603-623 will typically be directed by a processor configured to control the relevant parts of the analyser.

At step 607 a robot (for example a Cartesian coordinate robot) moves a detector (such as the detector 300 shown in FIG. 11) to a position over the pipette tip carrier assemblies 100. In this example the pipette tip carrier assemblies 100 each incorporate a PCB 121 comprising an array of LEDs (as described above with reference to FIGS. 2 to 5) as a light source, and at step 609 the LEDs are turned on. At step 611 the detector records an image of a particular pipette tip carrier assembly 100. The image is then analysed to identify which holes 115 in the frames 111 are vacant (based on the level of light from the LEDs visible at each hole 115, as discussed above), and using this information the number of pipette tips 201, 203 available in the pipette tip carrier assembly 100 is determined. Step 611 could also include analysing the image to determine whether the reference holes 435a, 435b are visible, if a pipette tip carrier assembly 400 of the kind shown in FIGS. 5-10 is provided. At step 613 the number of available pipette tips 201, 203 is compared to the number required by, for example, an assay (or stage of an assay) to be performed. If the number of pipette tips 201, 203 is below the number required, the process proceeds to step 613a, at which an error is raised to inform an operator that additional pipette tips 201, 203 are required. The operator can then return to step 601 and supply the pipette tip carrier assembly 100 with additional pipette tips 201, 203 in order to allow the assay to proceed.

If there is more than one pipette tip carrier assembly 100 present in the analyser, step 615 may be performed. This step is to check any of the pipette tip carrier assemblies 100 has not yet been imaged. If the answer is "yes", the process returns to step 607, at which the detector is moved to one of the pipette tip carrier assemblies 100 that has not yet been imaged. Steps 607 to 615 will be repeated until each of the pipette tip carrier assemblies 100 has been imaged. Step 613 may be configured to not raise an error (by proceeding to step 613a) until all of the pipette tip carrier assemblies 100 have been imaged (so that an error is only raised if the total number of pipette tips 201, 203 in the analyser is insufficient).

Once each pipette tip carrier 100 has been imaged, the process proceeds from step 615 to step 617, at which the LEDs are turned off and the assay proceeds. If one or more pipette tips carrier assemblies of the kind shown in FIGS. 5-10 are provided, step 617 may not proceed unless light from the reference holes 435a, 435b has been detected. If light is not detected from the reference holes 435a, 435b, an error may be raised requiring the user to engage the locking mechanism. The detector 300 could then re-image the pipette tip carrier assembly 400 and allow the assay to commence if light from the reference holes 435a, 435b is detected (or raise another error if no such light is detected). After the assay has commenced at step 617, step 619 is performed. This step is to check whether any of the one or more robots that are used to collect and transport pipette tips from the pipette tip carrier assembly during the assay are currently idle. This might be the case when, for example, the assay is required to allow some period of time for a reaction to proceed such that no further reagent or samples can be supplied during this time. If a robot is determined to be idle, the process may proceed to step 621. At step 621 the robot is controlled to rearrange the pipette tips 201, 203 in one or more of the pipette tip carrier assemblies 100 into the most optimal configuration for the remaining parts of the assay. The factors determining the optimal configuration can include those discussed above in the background section and the summary of the invention (such as arranging groups of pipette tips 201, 203 such that each pipette tip in a given group can be simultaneously collected by the robot). If none of the robots are idle, the process returns to step 617 (i.e. allows the assay to continue without interruption). The process could be configured such that step 619 is performed periodically at some predetermined interval of time, or such that the robots are continuously monitored. The process could also be configured such that step 621 is only performed if the idle robot is not expected to be required before it has been able to complete some or all of the desired rearrangement.

At step 623 the process checks whether the assay have been completed. If the answer is "yes", the process may return to step 601 and the analyser can be unloaded and/or resupplied with clean pipette tips 201, 203 for performing another assay. If the answer is "no", the process returns to step 617 and thus continues to monitor the activity of the robots and control them to optimise the arrangement of pipette tips when possible.

The invention claimed is:

1. A pipette tip carrier assembly for storing one or more pipette tips in a biochemical analyser, each pipette tip of the one or more pipette tips having an elongate dimension, the pipette tip carrier assembly comprising:
   a frame;
   a container; and
   a locking mechanism; wherein
      the frame comprises an array of holding elements, each holding element of the array of holding elements configured to hold, in use, a respective pipette tip such that the elongate dimension of each respective pipette tip is held parallel to a first axis the container comprises an opening configured to hold, in use, the frame such that each pipette tip held by the array of holding elements extends through the frame and into the container;

the container and the frame cooperatively define a restraining structure comprising a flange on the container, the flange configured to allow the frame to move in a direction perpendicular to the first axis when the frame is held at the opening of the container, the restraining structure configured to prevent the frame from moving along the first axis when the frame is held at the opening of the container whereby the frame is prevented from detaching from the pipette tip carrier assembly; and the locking mechanism is configured to urge the frame, in an engaged state, into a place wherein the frame is fixed, in relation to the container, under the flange and to prevent the frame, in the engaged state, from moving perpendicular to the first axis.

2. The pipette tip carrier assembly of claim 1, wherein the locking mechanism comprises a rotatable cam adjacent to the opening of the container; is configured to rotate between an engaged position and a disengaged position; and is configured to urge the frame into the restraining structure when rotated into the engaged position.

3. The pipette tip carrier assembly of claim 2, wherein the rotatable cam is configured to enable the frame to release from the restraining structure when the rotatable cam is rotated into the disengaged position.

4. The pipette tip carrier assembly of claim 1, wherein the container or the frame or both comprises one or more reference holes and the locking mechanism comprises one or more protrusions configured to cover the one or more reference holes in the container or in the frame or in both when the locking mechanism is in the engaged state, and to not cover the one or more reference holes when in a disengaged state; or to cover the one or more reference holes when the locking mechanism is in the disengaged state, and to not cover the one or more references holes when in the engaged state.

5. The pipette tip carrier assembly of claim 1, wherein the container or the frame or both comprises one or more reference holes and the pipette tip carrier assembly further comprising a light source arranged from within the container and to direct light towards the array of holding elements and the one or more reference holes.

6. A pipette tip storage system comprising:
a detector; and
a pipette tip container assembly for storing one or more pipette tips in a biochemical analyser, each pipette tip of the one or more pipette tips having an elongate dimension, the pipette tip container assembly comprising:
a light source;
a frame;
a container; and
a locking mechanism, wherein:
the frame comprises an array of holding elements, each holding element of the array of holding elements configured to hold, in use, a respective pipette tip such that the elongate dimension of each respective pipette tip is held parallel to a first axis;
the container comprises an opening configured to hold, in use, the frame such that each pipette tip held by the array of holding elements extends through the frame and into the container;
the container and the frame cooperatively define a restraining structure comprising a flange on the container, the flange configured to allow the frame to move in a direction perpendicular to the first axis when the frame is held at the opening of the container, the restraining structure configured to prevent the frame from moving along the first axis when the frame is held at the opening of the container whereby the frame is prevented from detaching from the pipette tip container assembly;
the locking mechanism is configured to urge the frame, in an engaged state, into a place wherein the frame is fixed, in relation to the container, under the flange and prevent the frame, in the engaged state, from moving perpendicular to the first axis;
the light source is arranged to direct light towards the array of holding elements;
the container or the frame or both comprises one or more reference holes; and wherein:
the detector is arranged external to the container and is configured to detect light from the light source exiting the container via the array of holding elements and the one or more reference holes.

* * * * *